(No Model.)  2 Sheets—Sheet 1.
F. C. WEIR.
MACHINE FOR CUTTING FROGS AND SWITCHES OF RAILROAD RAILS.
No. 246,433. Patented Aug. 30, 1881.
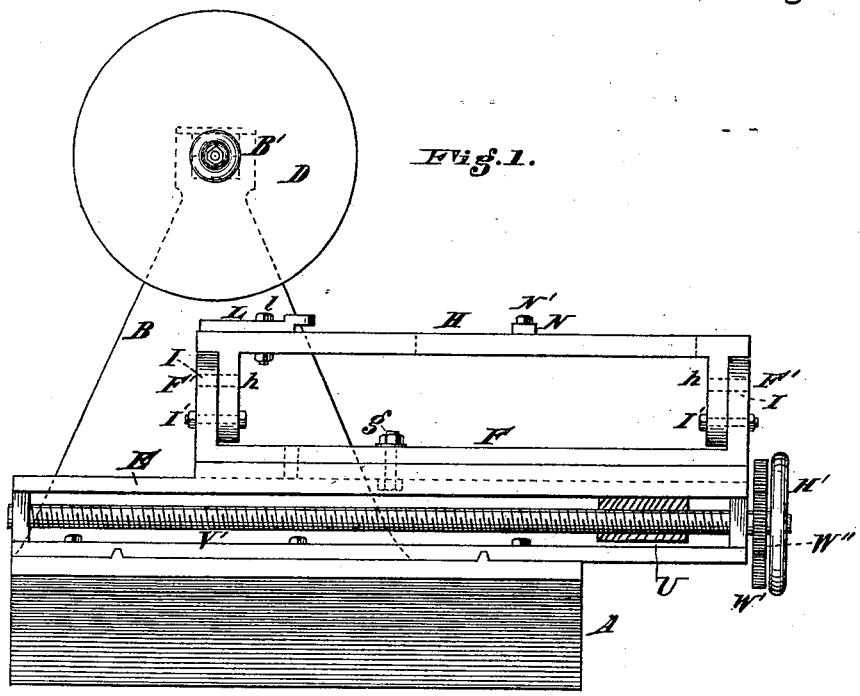
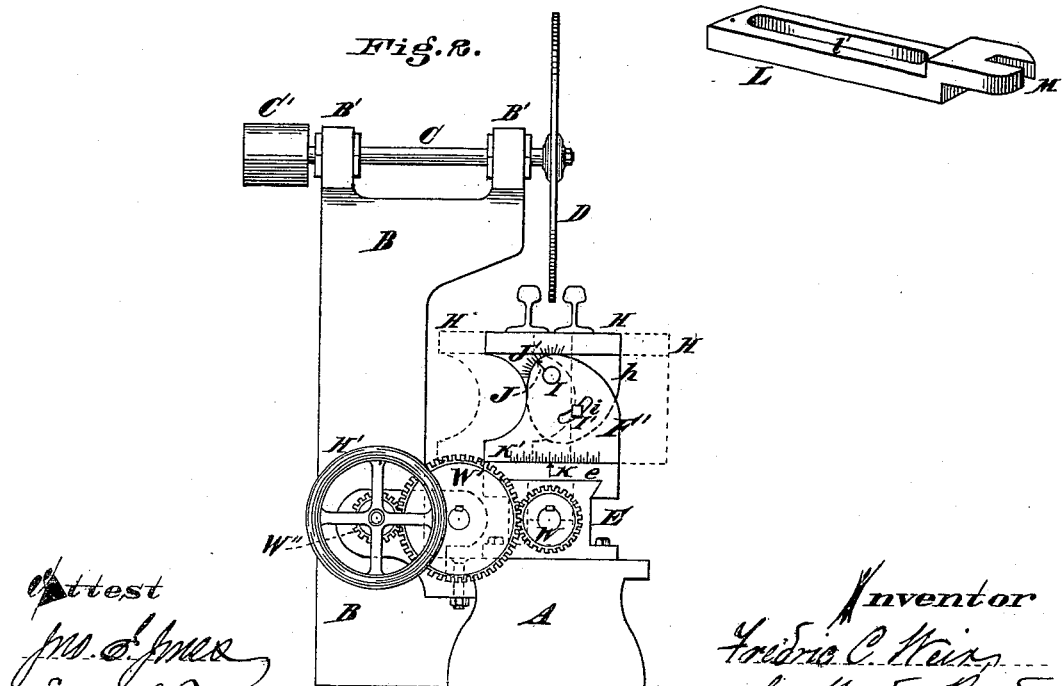
Attest
Inventor

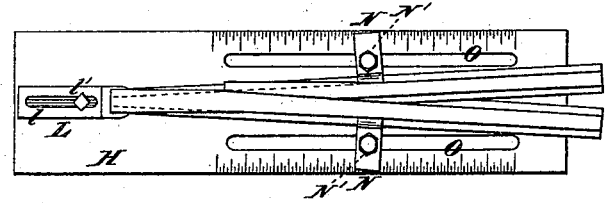
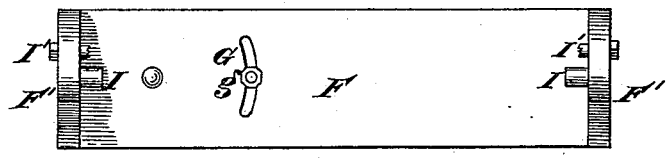
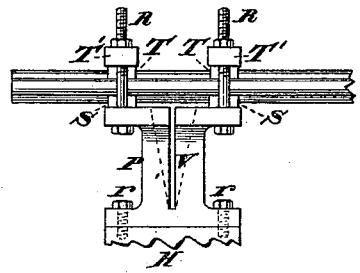
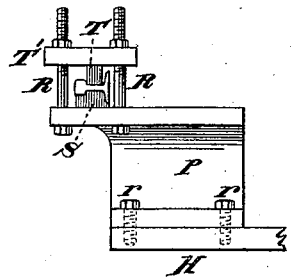
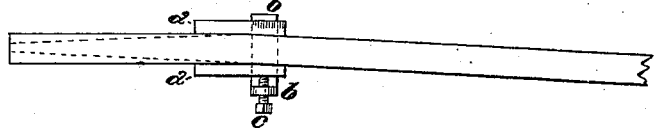

UNITED STATES PATENT OFFICE.

FREDRIC C. WEIR, OF CINCINNATI, OHIO.

MACHINE FOR CUTTING FROGS AND SWITCHES OF RAILROAD-RAILS.

SPECIFICATION forming part of Letters Patent No. 246,433, dated August 30, 1881.

Application filed April 25, 1881. (No model.)

*To all whom it may concern:*

Be it known that I, FREDRIC C. WEIR, a citizen of the United States, residing at Cincinnati, in the county of Hamilton and State of Ohio, have invented certain new and useful Improvements in Machines for Cutting Railroad-Rails for Frogs and Switches, of which the following is a specification.

My invention relates to improved means for cutting and pointing the railroad-rails used in making railway frogs and switches; and it consists, primarily, in the employment of an overhanging circular saw or disk in relation to and in connection with a reciprocating carriage working beneath said saw and provided with clamps for holding the rails, and also with means for effecting angular adjustments, whereby the rail may be run under the saw and cut to any desired angle or taper.

It further consists in the novel construction of the several parts of the machine and their various combinations with each other, substantially as I will now proceed to describe.

In the accompanying drawings, Figure 1 is a side elevation of a machine embodying my invention. Fig. 2 is an end elevation of the same, showing in dotted lines the position of the parts when the table is adjusted laterally. Fig. 3 is a detail perspective view of the device for clamping the front of the rail. Fig. 4 is a plan view of the table, showing the rails in position for sawing, the dotted lines thereon showing the path of the saw in cutting and the parts of the rails which are cut away. Fig. 5 is a plan view of the lower part of the table or bunk with the top removed. Fig. 6 is a front elevation of the device for cutting off the ends of the rails, showing it in position on the table, which latter is broken off. Fig. 7 is a side elevation of the same. Fig. 8 is a detail view of a rail and clamp, showing in dotted lines the portion to be cut away.

Similar letters of reference are employed to indicate the same parts in the several figures.

The main frame of the machine (marked A) is provided with a vertical extension or pillar, B, upon which is mounted in bearings B' B' an arbor or shaft, C, to one end of which is fixed a circular saw or disk, D, of iron or steel, and adapted to saw cold iron or steel, and to the other end of which is secured a driving-pulley, C', around which passes a belt from any suitable prime mover.

Mounted upon the main frame of the machine is a bed, E, provided with ways e, on which the carriage-frame slides. The latter is preferably made of the shape shown in Fig. 5, with the bottom plate, F, and the stocks F' F' at the ends. The plate F is provided with a semicircular slot, G, and up through this slot projects a clamping-bolt, g, connected to the bed-plate E.

By loosening the nut on the clamping-bolt g the carriage can be circularly adjusted upon the bed-plate in a horizontal plane, and then by tightening said nut again the carriage can be held in its adjusted position. Instead of this means for horizontal angular adjustment of the carriage-frame upon the bed-plate various other devices for accomplishing the result may be adopted.

The table H of the carriage, upon which the rails to be cut are supported, is provided at its ends with downwardly-projecting brackets h h, which are hinged to pivot-bolts I on the stocks F' F' of the carriage-frame. Slots i are made through the stocks F, and bolts I', connected to the brackets h h, pass through these slots and have nuts on their outer ends, as shown. This manner of mounting and connecting the table renders it easy to adjust it to any inclination to a horizontal plane by simply loosening the nuts on the bolts I', tilting the table to one side or the other, and then tightening up the nuts again, as before.

One of the stocks F has marked upon its outside a small index-finger or pointer, J, and the ends of the movable hinged table H are provided with a graduated scale, J', which co-operates with said finger J to indicate the degree of inclination of the upper face of the table H to a horizontal plane. The end of the bed E is likewise provided with an index-finger or pointer, K, and the end of the plate F of the carriage-frame is provided with a graduated scale, K', for co-operating with said index-finger to indicate the degree of the lateral adjustment of the carriage-frame upon the bed E, and consequently the lateral adjustment of the table H with respect to the plane of the path of the saw.

Mounted upon the top of the table H is a clamp, L, for holding the end of the rail while being cut. This clamp is secured to the table by means of a bolt, $l$, which passes down through a slot, $l'$, in it, and also through to the under side of the table, where it is secured by a nut. The slot $l'$ is made elongated, so as to permit of the longitudinal adjustment of the clamp. The forward end of the clamp is elevated above the table a sufficient distance to allow the flange of a rail to pass under it, and it is slotted vertically at M to admit the web of the rail. Also mounted upon the table H are a couple of clamps, N N, for resting upon the flanges of the rail while being cut. These clamps are secured to the table by means of clamping-bolts N', which pass down through oblique slots O O along the edges of the table, as shown, and are held where adjusted by means of nuts working on said bolts. Along the edges of the slots O O the table is graduated, as shown in Fig. 4, for the purpose of enabling the clamps N N to be adjusted with accuracy, so as to insure the cutting of the saw on the right lines.

To the under side of the bed E is secured a screw-block, into which works a feeding-screw, V', to which rotation is given from a hand-wheel, W'', through spur-gears W''', W'; and W, as shown in Figs. 1 and 2. By rotating the hand-wheel the carriage can be fed forward or backward—toward or from the saw—as desired. Any other form of feeding mechanism may be employed, if preferred.

In Fig. 4 I have shown the main-point rail and the short-point rail of a railroad-frog fitted together in the position they occupy in the completed frog. The dotted lines indicate the lines on which it is desired that the saw shall cut and also the parts of the rail designed to be removed. The two rails are placed upon the table H, and the end of the main-point rail is engaged with and caused to be held firmly by the clamp L. The clamps N N are then slid along the oblique slots O O until they obtain a firm bearing upon the outer flanges of the two rails, when they are firmly secured in place. In order that the combined rails may be held centrally upon the table H the clamps N N are adjusted at uniform distances along the slots O O, such uniformity being determined by an observation of the graduations along the sides of the slots, as indicated in Fig. 4. After the rails are properly clamped upon the table the clamping-bolt $g$ is loosened and the carriage-frame and table swung laterally, so as to adjust the rail to be cut to the proper angle with respect to the path of the saw, so that it will be cut to the proper taper. The degree of this lateral circular adjustment is ascertained by inspection of the index K and graduated scale K'.

The table H may be maintained perfectly level, so that the cut in the rail will be in a vertical plane or parallel to a plane drawn through the rail perpendicularly to its base, or it may be tilted to either side and locked by means of bolts I', so that the cut in the rail will be inclined more or less to such vertical plane, as will be readily understood.

It is obvious that means may be provided for vertically adjusting the bed-plate F to regulate the relative position of the table with respect to the saw, so as to adapt the machine to different lengths of rails.

Fig. 8 represents a rail bent at an angle and ready to have its head split off. The dotted lines represent the portions to be cut off to form the taper.

In order to prevent the saw from running off and making an incomplete cut, I preferably employ steel or iron clamp-blocks $a^2$, consisting of the cut-off or waste portion of the head of the rail, and clamp them by means of a clamp, $b$, and set-screw $c$ in position upon the sides of the head of the rail against the part where the kerf terminates. These clamp-blocks hold the portions of the rail being severed firmly in position, and prevent them from spreading and keep the cutting-disk to the line of its work at the terminal point of the taper-cut. One block only is used, of course, where the rail is cut one side only.

Any known form of clamp can be substituted for the one shown without departing from my invention in this particular.

In cutting off the ends of the rails or cross-cutting the heads of the rails for crossings a bunk, P, is fastened to the table H by bolts $r$, as shown in Figs. 6 and 7, and upon this bunk is secured a saddle, S, upon which the rail rests.

A follower, T, attached to cross-heads T', co-operates with the saddle and is adapted to be set firmly down upon the rail by means of the saddle-clamp bolts R R to hold the rail in position for sawing. A slot, V, is formed in the bunk P for the saw to pass through, and said slot may be made V-shaped, as shown in the dotted lines, Fig. 6, to allow the rails to be cut off at any angle, instead of directly across.

Instead of screws for operating the cross-heads T' and clamps N, cams or eccentrics operated by levers may be employed as clamping devices.

I claim—

1. In a machine for cutting railroad-rails for frogs and switches, the combination of a circular saw or cutting-disk, a reciprocating rail-holding table, and devices for adjusting said table more or less out of a horizontal plane and securing it in adjusted position, substantially as described, for the purpose specified.

2. In a machine for cutting railroad-rails for frogs and switches, the combination of a circular saw or cutting-disk, a reciprocating rail-holding table, devices for adjusting the table more or less out of a horizontal plane, and other devices for adjusting said table horizontally on a vertical axis, substantially as described, for the purpose specified.

3. The combination, with the rail-holding table H, having the oblique slots O O, and the graduations along said slots, of the adjustable clamps N N, whereby the rails are held centrally upon the table, substantially as described.

4. The carriage H, pivoted by the pivots I to the reciprocating carriage, and rendered adjustable out of a horizontal plane by means of bolts I', working in slots i, substantially as described.

5. The combination, with the table H, and stocks F F to which it is pivoted, of the graduations J' on the table, and the pointer J on one of the stocks, substantially as described, for the purpose specified.

6. The combination, with the bed E, provided with slot G and index-finger K, of the bolt g and the plate F, having the graduated scale at its end, substantially as described.

7. The adjustable clamp L, having its forward end raised, so as to rest upon the flanges of the rail, and slotted at M to accommodate the web of the rail, substantially as described.

8. In the rail cutting and tapering machine, the iron clamp a and clamp-block b, secured to the rail at the terminal point of the kerf, for preventing the saw from running off at the end of the taper, substantially as herein set forth.

9. In combination with the overhanging circular saw D and horizontally-moving table H, the cross-cut bunk P and saddle S and clamps R R for cross-cutting railroad-rails, substantially as herein set forth.

In testimony whereof I have hereunto set my hand in the presence of two subscribing witnesses.

FREDRIC C. WEIR.

Witnesses:
 EUGENE L. FIRNKALSS,
 J. H. CHARLES SMITH.